United States Patent
Daian

(10) Patent No.: US 8,818,123 B2
(45) Date of Patent: Aug. 26, 2014

(54) IMAGE PROCESSING APPARATUS AND IMAGE CONVERSION APPARATUS

(75) Inventor: Hideki Daian, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 260 days.

(21) Appl. No.: 13/142,340

(22) PCT Filed: Mar. 24, 2009

(86) PCT No.: PCT/JP2009/055830
§ 371 (c)(1),
(2), (4) Date: Jun. 27, 2011

(87) PCT Pub. No.: WO2010/084628
PCT Pub. Date: Jul. 29, 2010

(65) Prior Publication Data
US 2011/0268366 A1    Nov. 3, 2011

(30) Foreign Application Priority Data

Jan. 20, 2009  (JP) .................................. 2009-009473

(51) Int. Cl.
*G06K 9/36* (2006.01)
*G06K 9/46* (2006.01)

(52) U.S. Cl.
USPC ............................ 382/239; 382/236; 382/238

(58) Field of Classification Search
CPC .................. H04N 19/00145; H04N 19/00157; H04N 19/00909
USPC .......................... 382/232, 236, 239, 248, 238; 375/240.12–240.16
See application file for complete search history.

(56) References Cited

U.S. PATENT DOCUMENTS

| | | | |
|---|---|---|---|
| 6,483,851 B1 * | 11/2002 | Neogi ........................... | 370/466 |
| 6,983,079 B2 * | 1/2006 | Kim ............................. | 382/275 |
| 2002/0047919 A1 * | 4/2002 | Kondo et al. ................. | 348/441 |
| 2003/0206587 A1 * | 11/2003 | Gomila .................... | 375/240.12 |

(Continued)

FOREIGN PATENT DOCUMENTS

| | | |
|---|---|---|
| JP | 2001-245293 A | 9/2001 |
| JP | 2004 343451 | 12/2004 |
| JP | 2005 70938 | 3/2005 |
| JP | 2008 22404 | 1/2008 |
| JP | 2008-205534 A | 9/2008 |
| JP | 2008 263529 | 10/2008 |

OTHER PUBLICATIONS (Xu et al. ("An Adaptive De-blocking Method based on Measuring Flatness of Macroblock,"ISPACS 2006, pp. 1-4).*

(Continued)

*Primary Examiner* — Yubin Hung
(74) *Attorney, Agent, or Firm* — Oblon, Spivak, McClelland, Maier & Neustadt, L.L.P.

(57) ABSTRACT

A technique for eliminating the unnaturalness in a generated moving image while achieving high speed processing in an image processing apparatus which includes a deblocking filter is provided. A transcoder includes an MPEG2 decoder, a strength evaluation circuit, and an H.264 encoder. The strength evaluation circuit calculates a filter strength parameter on the basis of an image feature value parameter acquired by the MPEG2 decoder. The H.264 encoder applies a deblocking filter to an input image on the basis of the filter strength parameter in a coding process. The H.264 encoder codes a picture while the strength evaluation circuit performs a filter strength calculation process on a subsequent picture concurrently.

8 Claims, 5 Drawing Sheets

(56) References Cited

U.S. PATENT DOCUMENTS

| | | | |
|---|---|---|---|
| 2004/0017852 A1* | 1/2004 | Garrido et al. | 375/240.16 |
| 2004/0228535 A1 | 11/2004 | Honda et al. | |
| 2005/0062746 A1 | 3/2005 | Kataoka et al. | |
| 2006/0002477 A1* | 1/2006 | Bae | 375/240.24 |
| 2006/0182356 A1* | 8/2006 | Lillevold | 382/236 |
| 2007/0217520 A1* | 9/2007 | Kim et al. | 375/240.27 |
| 2008/0101469 A1* | 5/2008 | Ishtiaq et al. | 375/240.13 |
| 2008/0199090 A1* | 8/2008 | Tasaka et al. | 382/233 |
| 2008/0253454 A1* | 10/2008 | Imamura et al. | 375/240.13 |
| 2008/0307198 A1 | 12/2008 | Kataoka et al. | |
| 2009/0141814 A1* | 6/2009 | Yin et al. | 375/240.29 |
| 2009/0263032 A1* | 10/2009 | Tanaka et al. | 382/233 |
| 2009/0304085 A1* | 12/2009 | Avadhanam et al. | 375/240.24 |
| 2009/0304086 A1* | 12/2009 | Shi et al. | 375/240.24 |

OTHER PUBLICATIONS

Zhang et al. ("An Efficient Arithmetic for Deblocking Filter of H264AVC Video Coding," 4th Int'l Conf. on Wireless Communications, Networking and Mobile Computing, Oct. 12-14, 2008, pp. 1-3).*

Raja et al. ("In-loop deblocking filter for JVT H264AVC," 5th WSEAS Int'l Conf. Signal Processing, Robotics and Automation, 2006, pp. 235-240).*

International Search Report Issued Apr. 21, 2009 in PCT/JP09/055830 filed Mar. 24, 2009.

* cited by examiner

IMAGE PROCESSING APPARATUS AND IMAGE CONVERSION APPARATUS

TECHNICAL FIELD

The present invention relates to an image processing apparatus for coding an image in accordance with a predetermined coding system and a transcoder and a translator both for converting a coding system of images.

BACKGROUND ART

An encoder or a transcoder codes images in accordance with various coding systems. The coding systems include MPEG (Moving Picture Experts Group) 2, H.264, and other various systems. In the coding according to these image coding systems, since images are coded by blocks such as macroblocks, there arises variation in the image quality at a block boundary in a coded image. Such a noise is termed a "block noise".

The block noise is marked especially in a flat portion and a gradation portion of an image. Therefore, in environments where high image quality is required, the noises at block boundaries are reduced by performing a deblocking process.

[Patent Document 1] Japanese Patent Application Laid Open Gazette No. 2008-22404

[Patent Document 2] Japanese Patent Application Laid Open Gazette No. 2008-263529

An encoder disclosed in Patent Document 1 comprises a deblocking filter to reduce the block noises. The encoder of Patent Document 1 performs a deblocking process on images decoded by a local decoder.

In conventional encoders including the encoder of Patent Document 1, a strength evaluation circuit which determines the filter strength of the deblocking filter is incorporated in a coding circuit block. For this reason, acquisition of the image feature value and evaluation of the filter strength are performed simultaneously with coding, and the process therefore becomes complicated and may cause a delay. Further, since the filter strength instantaneously changes in accordance with the image feature value, when a great change of the image feature value is caused by, for example, a scene change or the like, there arises variation in filter strength among pictures and this disadvantageously causes unnatural instability in moving images.

A coding apparatus disclosed in Patent Document 2 uses an average value of filter strengths calculated on a plurality of pictures.

DISCLOSURE OF INVENTION

The present invention is intended for an image processing apparatus. According to an aspect of the present invention, the image processing apparatus comprises a strength evaluation circuit for calculating a filter strength from an image feature value of an input image, and a coding circuit for coding the input image and outputting a coded stream, and in the image processing apparatus of the present invention, the coding circuit includes a filter part for performing a deblocking filtering process on an image generated in a coding process on the basis of the filter strength, and a process of calculating the filter strength performed by the strength evaluation circuit and the coding process performed by the coding circuit are performed concurrently.

By using the image processing apparatus of the present invention, it is possible to increase the processing speed of the coding process.

According to a preferred embodiment of the present invention, the filter part includes a filter strength correction part for correcting the filter strength to be applied to a current picture by using an arithmetic expression with the filter strength calculated for the current picture and the filter strength calculated for a past picture used as an input parameter.

It is thereby possible to prevent variation in the filter strength following an abrupt change of the image feature value.

The present invention is also intended for an image conversion apparatus. According to another aspect of the present invention, the image conversion apparatus comprises a decoding circuit for decoding an inputted first coded stream and outputting a decoded image, a strength evaluation circuit for calculating a filter strength from an image feature value of the decoded image, and a coding circuit for coding the decoded image and outputting a second coded stream, and in the image conversion apparatus of the present invention, the coding circuit includes a filter part for performing a deblocking filtering process on an image generated in a coding process on the basis of the filter strength, and a process of calculating the filter strength performed by the strength evaluation circuit and the coding process performed by the coding circuit are performed concurrently.

Therefore, it is an object of the present invention to provide a technique for eliminating the unnaturalness in a generated moving image while achieving high speed processing in an image processing apparatus comprising a deblocking filter.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
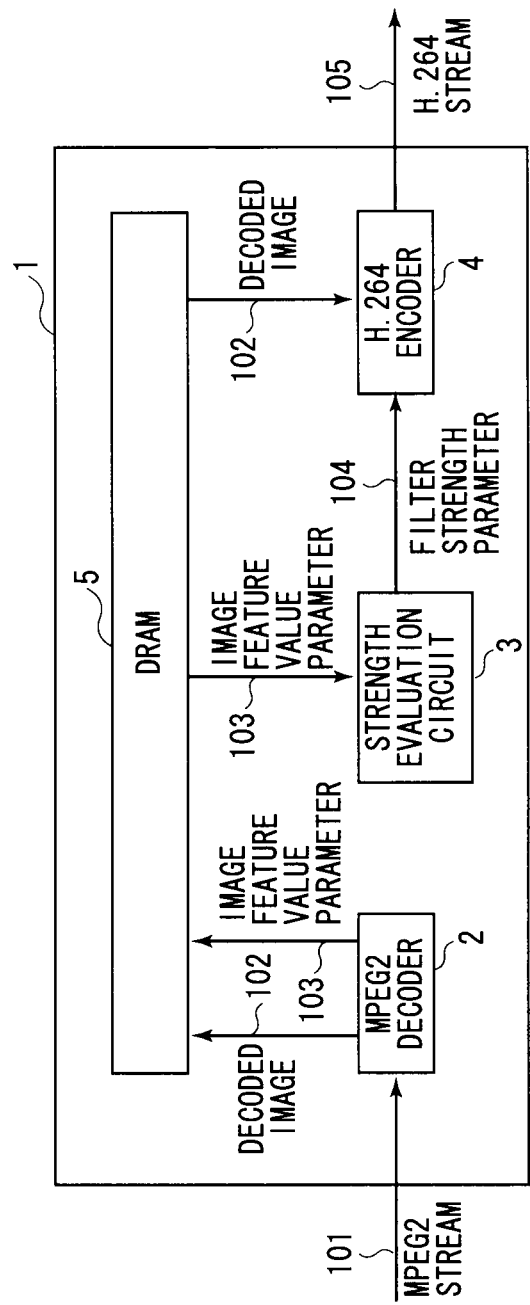
FIG. 1 is a block diagram showing a transcoder in accordance with a preferred embodiment.

Hereinafter, with reference to Figures, the preferred embodiment of the present invention will be discussed. FIG. 1 is a circuit block diagram showing a transcoder 1 in accordance with this preferred embodiment. The transcoder 1 comprises an MPEG2 decoder 2, a strength evaluation circuit 3, an H.264 encoder 4, a DRAM (Dynamic Random Access Memory) 5.

The MPEG2 decoder 2 receives an MPEG2 stream 101 coded in accordance with an MPEG2 coding system and decodes the MPEG2 stream 101. Then, the MPEG2 decoder 2 stores a decoded image 102 into the DRAM 5.

The MPEG2 decoder 2 further acquires the image feature value of the decoded image 102 from the MPEG2 stream 101 and stores an image feature value parameter 103 into the DRAM 5.

The image feature value parameter 103 stored into the DRAM 5 by the MPEG2 decoder 2 includes a picture activity value act_pic and a picture motion evaluation value sad_pic.

<Image Feature Value Parameter>

First, discussion will be made on a method of calculating the picture activity value act_pic. As expressed by Eq. (1), the MPEG2 decoder 2 first calculates a decoded image "recon".

$$recon = \begin{cases} diff & \text{(for } intraMB) \\ diff + pred & \text{(for } interMB) \end{cases} \quad (1)$$

In Eq. (1), for an intra macroblock (intra MB), the decoded image "recon" represents a pixel value of the decoded image. For an inter macroblock (inter MB), the decoded image "recon" is obtained by adding a prediction error value "diff" to a pixel value "pred" of a prediction pixel block. The pixel value "pred" of the prediction pixel block is obtained by applying motion compensation to a pixel value of a reference pixel block.

Figure 2:
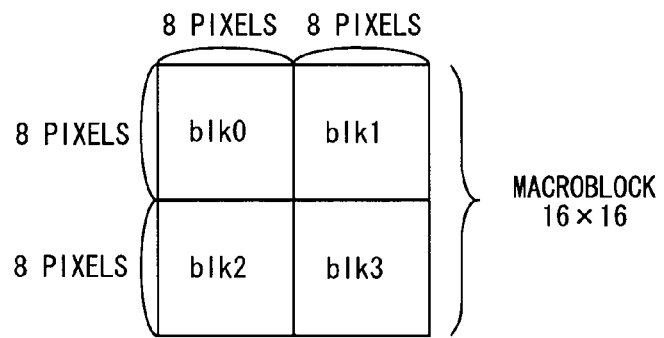
FIG. 2 is a view showing a structure of blocks.

Next, from Eq. (2), an average value of the decoded images "recon" is calculated for each block "blk", to thereby obtain an average decoded image value AVE_recon. The block "blk" consists of 8×8 pixels, and a macroblock consists of four blocks "blk0" to "blk3" as shown in FIG. 2.

$$AVE\_recon = \frac{1}{64} \sum_{j=0}^{7} \sum_{i=0}^{7} recon \quad (2)$$

Further, as expressed by Eq. (3), a sum of absolute differences (SAD) of the decoded images "recon" and the average decoded image value AVE_recon is calculated for each block "blk". Then, the sums of absolute differences calculated for the blocks "blk0" to "blk3" are added together, to thereby obtain a macroblock activity value act_mb.

$$act\_mb = \sum_{blk=0}^{3} \sum_{j=0}^{7} \sum_{i=0}^{7} |AVE\_recon - recon| \quad (3)$$

Then, as expressed by Eq. (4), the macroblock activity values act_mb for all the macroblocks in a frame are added together, to thereby obtain the picture activity value act_pic.

$$act\_pic = \quad (4)$$
$$\frac{1}{M} \sum_{k=0}^{M-1} act\_mb(k) \ (M; \text{the total number of } MBs \text{ in a picture})$$

Subsequently, discussion will be made on a method of calculating the picture motion evaluation value sad_pic. As expressed by Eq. (5), the MPEG2 decoder 2 calculates a sum of absolute values of the prediction error values "diff" for each block "blk" in the inter macroblock (inter MB). Further, the sums of absolute values calculated for the blocks "blk0" to "blk3" are added together, to thereby obtain a macroblock motion evaluation value sad_mb.

$$sad\_mb = \sum_{blk=0}^{3} \sum_{j=0}^{7} \sum_{i=0}^{7} |diff| \ \text{(for } interMB) \quad (5)$$

Then, as expressed by Eq. (6), the macroblock motion evaluation value sad_mb for all the macroblocks in the frame are added together, to thereby obtain the picture motion evaluation value sad_pic.

$$sad\_pic = \quad (6)$$
$$\frac{1}{M} \sum_{k=0}^{M-1} sad\_mb(k) \ (M; \text{the total number of } MBs \text{ in a picture})$$

<Calculation of Filter Strength>

Referring again to FIG. 1, the strength evaluation circuit 3 reads the image feature value parameter 103 stored by the MPEG2 decoder 2 from the DRAM 5. The strength evaluation circuit 3 uses the picture activity value act_pic and the picture motion evaluation value sad_pic included in the image feature value parameter 103 to calculate a filter strength parameter 104.

Hereinafter, discussion will be made on a method of calculating the filter strength parameter 104 performed by the strength evaluation circuit 3. The strength evaluation circuit 3 holds various parameter values such as a threshold value, as expressed by Eq. (7), in a not-shown register and uses theses parameters to perform the following process.

$$\begin{cases} act\_pic\_thr = 1800 \\ sad\_pic\_thr = 650 \\ dbf\_coef = 0.75 \\ dbf\_value\_min = -7 \\ dbf\_value\_max = 4 \\ dbf\_value\_def = 0 \end{cases} \quad (7)$$

Figure 3:
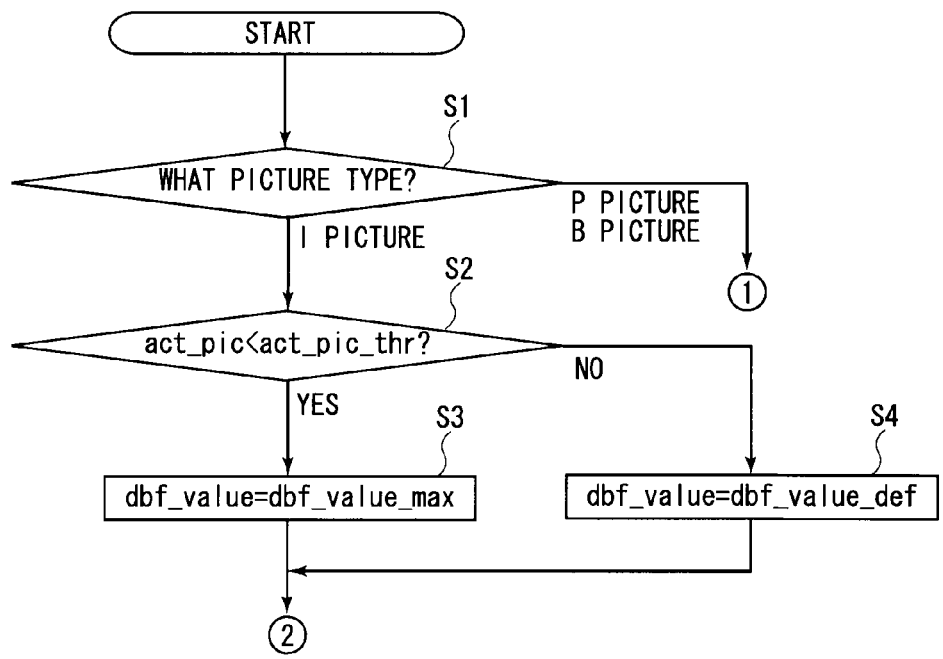
FIGS. 3, 4, and 5 are flowcharts showing a flow of calculation of a filter strength parameter.
Figure 4:
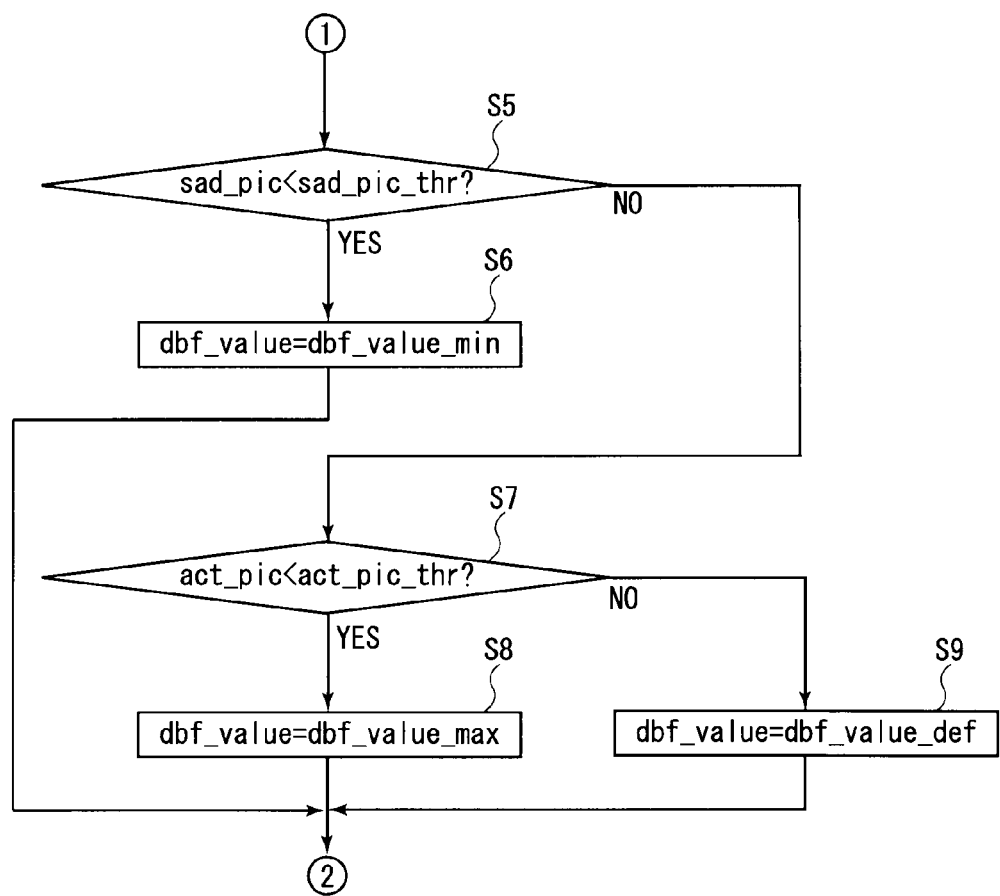
Figure 5:
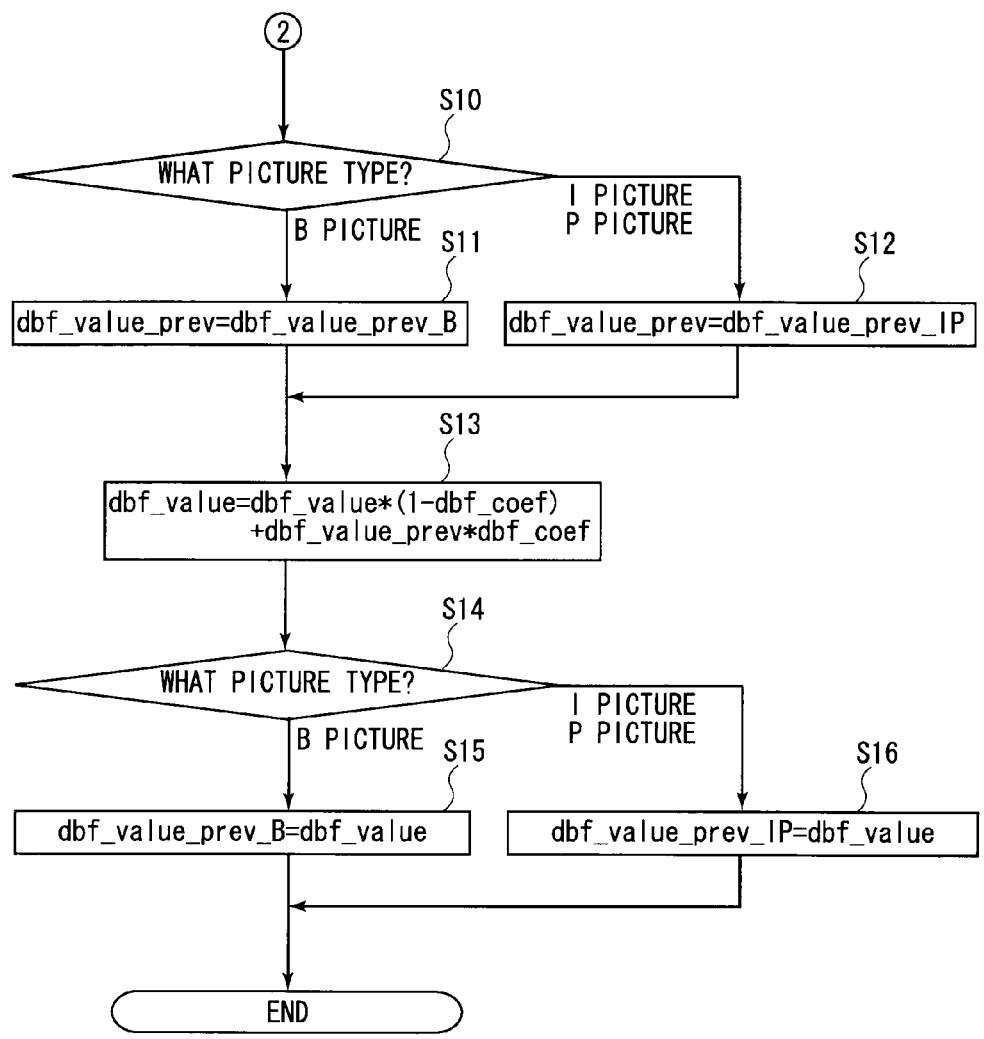

The strength evaluation circuit 3 performs a process shown in FIGS. 3 to 5 to calculate the filter strength parameter 104. First, the strength evaluation circuit 3 determines the picture type of a frame to be coded (Step S1).

When the picture type is I picture, the strength evaluation circuit 3 compares the picture activity value act_pic with an activity threshold value act_pic_thr to determine which is larger (Step S2). Herein, as expressed by Eq. (7), act_pic_thr=1800.

When act_pic<act_pic_thr ("YES" in Step S2), a maximum evaluation value dbf_value_max is set as a deblocking filter evaluation value dbf_value (Step S3). In this case, as expressed by Eq. (7), dbf_value_max=4. The deblocking filter evaluation value dbf_value takes an integer value ranging from −7 to 6. As the deblocking filter evaluation value dbf_value becomes larger, the filter strength of the deblocking filter is set greater.

When act_pic≥act_pic_thr ("NO" in Step S2), a default evaluation value dbf_value_def is set as the deblocking filter evaluation value dbf_value (Step S4). In this case, as expressed by Eq. (7), dbf_value_def=0.

Thus, when the picture activity value act_pic is smaller than the activity threshold value act_pic_thr, it is assumed that the picture to be coded is an image required to represent delicate changes, such as a flat image or a gradation image. Then, the maximum evaluation value dbf_value_max is assigned as the deblocking filter evaluation value dbf_value to improve the image quality. On the other hand, when the picture activity value act_pic is not smaller than the activity threshold value act_pic_thr, since it is judged that the image is complicate to some degree, the default evaluation value dbf_value_def is assigned as the deblocking filter evaluation value dbf_value. Though the maximum evaluation value dbf_value_max is set to be 4 herein, this value may be changed as appropriate. Further, the default evaluation value dbf_value_def may take a value other than 0.

In Step S1, when it is judged that the picture type is P picture or B picture, the process goes to the flowchart of FIG. 4. First, the strength evaluation circuit 3 compares the picture motion evaluation value sad_pic with a motion threshold value sad_pic_thr to determine which is larger (Step S5). Herein, as expressed by Eq. (7), sad_pic_thr=650.

When sad_pic<sad_pic_thr ("YES" in Step S5), a minimum evaluation value dbf_value_min is set as the deblocking filter evaluation value dbf_value (Step S6). In this case, as expressed by Eq. (7), dbf_value_min=−7.

Thus, when the picture motion evaluation value sad_pic is smaller than the motion threshold value sad_pic_thr, since it is judged that the picture to be coded has a small prediction error and causes less degradation in the image quality or that the picture has relatively less motion, the minimum evaluation value dbf_value_min is assigned as the deblocking filter evaluation value dbf_value. It is thereby possible to prevent the fineness of the image from being damaged by the function of the deblocking filter which is stronger than necessary.

When sad_pic≥sad_pic_thr ("NO" in Step S5), the strength evaluation circuit 3 compares the picture activity value act_pic with the activity threshold value act_pic_thr to determine which is larger (Step S7). Herein, as expressed by Eq. (7), act_pic_thr=1800.

When act_pic<act_pic_thr ("YES" in Step S7), the maximum evaluation value dbf_value_max is set as the deblocking filter evaluation value dbf_value (Step S8). In this case, as expressed by Eq. (7), dbf_value_max=4.

When act_pic≥act_pic_thr ("NO" in Step S7), the default evaluation value dbf_value_def is set as the deblocking filter evaluation value dbf_value (Step S9). In this case, as expressed by Eq. (7), dbf_value_def=0.

Thus, when the picture activity value act_pic is smaller than the activity threshold value act_pic_thr, it is assumed that the picture to be coded is an image required to represent delicate changes, such as a flat image or a gradation image. Then, the maximum evaluation value dbf_value_max is assigned as the deblocking filter evaluation value dbf_value to improve the image quality. On the other hand, when the picture activity value act_pic is not smaller than the activity threshold value act_pic_thr, since it is judged that the image is complicate to some degree, the default evaluation value dbf_value_def is assigned as the deblocking filter evaluation value dbf_value.

After the deblocking filter evaluation value dbf_value is set in Step S3, Step S4, Step S6, Step S8, or Step S9, the process goes to the flowchart of FIG. 5. The strength evaluation circuit 3 first determines the picture type of the frame to be coded (Step S10).

When the picture type is B picture, the strength evaluation circuit 3 sets a B picture filter evaluation value dbf_value_prev_B as a previous filter evaluation value dbf_value_prev (Step S11).

The strength evaluation circuit 3 holds the B picture filter evaluation value dbf_value_prev_B in a not-shown register. In Step S11, the B picture filter evaluation value dbf_value_prev_B stored in the register is read out and set as the previous filter evaluation value dbf_value_prev.

When the picture to be coded is I picture or P picture, the strength evaluation circuit 3 sets an IP picture filter evaluation value dbf_value_prev_IP as the previous filter evaluation value dbf_value_prev (Step S12).

The strength evaluation circuit 3 holds the IP picture filter evaluation value dbf_value_prev_IP in a not-shown register. In Step S12, the IP picture filter evaluation value dbf_value_prev_IP stored in the register is read out and set as the previous filter evaluation value dbf_value_prev.

After the previous filter evaluation value dbf_value_prev is set in Step S11 or Step S12, weighting addition of the deblocking filter evaluation value dbf_value and the previous filter evaluation value dbf_value_prev is performed, to thereby correct the deblocking filter evaluation value dbf_value (Step S13). Specifically, weighting addition of the filter evaluation value calculated for the picture to be coded and the filter evaluation value calculated for the picture which has been coded last time is performed.

For B picture, however, the previous filter evaluation value dbf_value_prev is the evaluation value calculated for the B picture which has been coded immediately before. On the other hand, for I picture or P picture, the previous filter evaluation value dbf_value_prev is the evaluation value calculated for the I picture or the P picture which has been coded immediately before.

Thus, for B picture and the P picture, individual (different) values are stored as the previous filter evaluation value dbf_value_prev. This is because the picture motion evaluation value sad_pic for P picture is assumed to be, for example, about twice as large as the picture motion evaluation value sad_pic for B picture and the filter strength is optimized by using different evaluation values. Further, though the same evaluation value is stored as the previous filter evaluation value dbf_value_prev for I picture and P picture in this preferred embodiment, individual (different) evaluation values may be stored also for I picture and P picture.

Specifically, as shown in FIG. 5, the deblocking filter evaluation value dbf_value is multiplied by a weighting value (1−dbf_coef) and the previous filter evaluation value dbf_value_prev is multiplied by a weighting value (dbf_coef), and then these products are added together. In this case, as expressed by Eq. (7), dbf_coef is set to be 0.75. Thus, though dbf_coef is set to be 0.75 and the weighting value for the previous filter evaluation value dbf_value_prev is larger in this preferred embodiment, this value may be changed as appropriate.

Subsequently, the strength evaluation circuit 3 determines the picture type of the frame to be coded (Step S14). When the picture to be coded is B picture, the previous filter evaluation value dbf_value_prev_B is updated by using the deblocking filter evaluation value dbf_value corrected by the weighting addition (Step S15). When the picture to be coded is I picture or P picture, the previous filter evaluation value dbf_value_prev_IP is updated by using the deblocking filter evaluation value dbf_value corrected by the weighting addition (Step S16). Through the above process, the calculation of the deblocking filter evaluation value dbf_value for the current picture to be coded is completed.

Referring again to FIG. 1, the H.264 encoder 4 acquires the decoded image 102 from the DRAM 5. The H.264 encoder 4 acquires the deblocking filter evaluation value dbf_value as the filter strength parameter 104 from the strength evaluation circuit 3.

The H.264 encoder 4 codes the decoded image 102 in accordance with the H.264 coding system and outputs an H.264 stream 105. The H.264 encoder 4 performs a deblocking filtering process in the process of coding the decoded image 102. Specifically, the H.264 encoder 4 performs the deblocking filtering process on the image decoded by the local decoder. At that time, as filter parameters for the deblocking process, used are the following three parameters P1 to P3.

P1=disable_deblocking_filter_idc
P2=slice_alpha_c0_offset_div2
P3=slice_beta_offset_div2

The parameter P1 is used for determining whether to apply the deblocking filter. When the deblocking filter evaluation value dbf_value=−7, the parameter P1 is set to be 1 and application of the deblocking filter is set to be "OFF". When the deblocking filter evaluation value dbf_value ranges from −6 to 6, the parameter P1 is set to be 0 and application of the deblocking filter is set to be "ON". As discussed above, the deblocking filter evaluation value dbf_value=−7 in Step S6 of FIG. 4, the deblocking filter is not applied.

The parameters P2 and P3 are used for setting the filter strength of the deblocking filter, and it is assumed in this preferred embodiment that the parameters P2=P3=dbf_value. As discussed above, the deblocking filter evaluation value dbf_value=4 in Step S3 of FIG. 3 and Step S8 of FIG. 4, and the deblocking filter having relatively high strength is applied.

The local decoded image after being subjected to the deblocking filtering process is stored into the DRAM 5 to be used for subsequent coding process by the H.264 encoder 4. When it is found in advance that the current picture is not used as a reference image in the subsequent coding process, however, it is not necessary to perform the deblocking filtering process or store the image into the DRAM 5. Omission of these processes allows reduction in the computation throughput and the memory capacity.

<Process Sequence>

Figure 6:
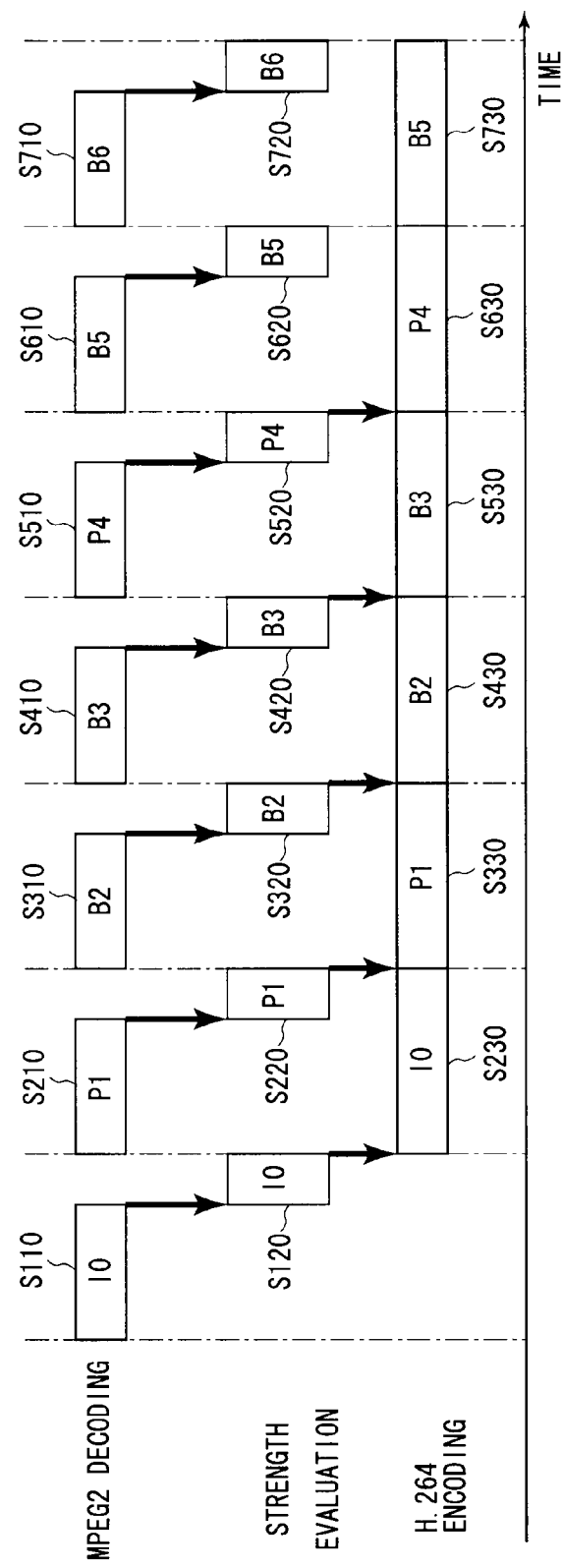
FIG. 6 is a sequence diagram showing a decoding process, a strength evaluation process, and a coding process.

FIG. 6 is a view showing a process sequence of the transcoder 1 of this preferred embodiment. In FIG. 6, the first stage represents a decoding process sequence for the MPEG2 stream 101, which is performed by the MPEG2 decoder 2. The second stage in FIG. 6 represents a calculation process sequence for the filter strength parameter 104, which is performed by the strength evaluation circuit 3. The third stage in FIG. 6 represents a coding process sequence for the H.264 stream 105, which is performed by the H.264 encoder 4.

First, in Step S110, the MPEG2 decoder 2 performs the decoding process for I picture (I0). Subsequently, in Step S120, the strength evaluation circuit 3 calculates the filter strength parameter 104 on the basis of the image feature value parameter 103 for the I picture (I0). Further subsequently, in Step S230, the H.264 encoder 4 performs the coding process for the I picture (I0).

Concurrently with Step S230, the MPEG2 decoder 2 performs the decoding process for P picture (P1) (Step S210). Further, concurrently with Step S230, the strength evaluation circuit 3 calculates the filter strength parameter 104 for the P picture (P1) (Step S220).

Thus, since the strength evaluation circuit 3 and the H.264 encoder 4 are different circuit blocks in the transcoder 1 of the present preferred embodiment, the H.264 encoder 4 performs the coding process while the strength evaluation circuit 3 calculates the filter strength parameter 104 for the next picture concurrently.

Subsequently, in Step S330, the H.264 encoder 4 performs the coding process for the P picture (P1). Concurrently with Step S330, the MPEG2 decoder 2 performs the decoding process for B picture (B2) (Step S310). Further, concurrently with Step S330, the strength evaluation circuit 3 calculates the filter strength parameter 104 for the B picture (B2) (Step S320). Thus, concurrently with the coding process for P picture, the filter strength parameter 104 can be calculated from B picture.

After that, similarly, the coding process for the B picture (B2) is performed in Step S430 while Steps S410 and S420 can be executed to calculate the filter strength parameter 104 from B picture (B3).

Further, the coding processes for the B picture (B3), P picture (P4), and B picture (B5) are performed in Steps S530, S630, and S730 while the filter strength parameters 104 can be calculated from the P picture (P4), the B picture (B5), and B picture (B6) in Steps S520, S620, and S720.

As discussed above, since the strength evaluation circuit 3 for calculating the filter strength parameter 104 and the H.264 encoder 4 are different circuits blocks in the transcoder 1 of the present preferred embodiment, a pipeline processing can be performed, where the calculation of the filter strength parameter 104 and the coding of the H.264 stream 105 are performed concurrently, to thereby increase the processing speed. In other words, since the filter strength parameter 104 is calculated from the image feature value parameter 103 for one picture in advance and then the coding process starts, the procedure of the coding process becomes simpler and this causes an increase in the processing speed.

Further, the deblocking filter evaluation value dbf_value used as the filter strength parameter 104 is corrected by the weighting addition with the evaluation value calculated from the picture to be coded and the evaluation value calculated from the picture which has been coded last time. It is thereby possible to prevent an abrupt change in the filter strength following a great change of the image feature value parameter 103. Further, it is possible to prevent degradation in the image quality caused by the variations in the filter strength among pictures and obtain smoother moving images.

<Variations>

In the above-discussed preferred embodiment, the transcoder for converting the MPEG2 stream into the H.264 stream is taken as an example. As another exemplary case, the present invention may be applied to an H.264 translator. In this case, though a filter strength parameter of an input stream can be used in the encoder, an optimized strength parameter may be determined by integrated evaluation of the strength parameter acquired from the input stream and the filter strength obtained by the method of the present invention.

Further, though the case where the MPEG2 coding system is converted into the H.264 coding system is taken as an example in the above-discussed preferred embodiment, this is only one exemplary application of the present invention. The present invention may be applied to, for example, a case where a decoder decodes a stream coded in a coding system other than the MPEG2 coding system or a case where an encoder encodes a stream into a coded stream of MPEG2, VC-1 (Video Codec 1), or the like.

Furthermore, when one picture in an input stream consists of a plurality of slices, there may be a method in which an average value of the filter strengths of the slices in the picture is obtained and the average value is used as a base for the filter strength of the picture.

While the invention has been shown and described in detail, the foregoing description is in all aspects illustrative and not restrictive. It is therefore understood that numerous modifications and variations can be devised without departing from the scope of the invention.

The invention claimed is:

1. An image processing apparatus, comprising:
    a strength evaluation circuit configured to:
        (1) calculate a filter strength from an image feature value of an input image when a picture type of the input image is I picture, wherein the image feature value is to be obtained in units of pictures, and the image feature value is based on a picture activity value obtained by adding the absolute values of the activity values of all the macroblocks included in the I picture, and
        (2) calculate a filter strength from the image feature value of the input image when the picture type of the input image is P picture or B picture, wherein the image feature value is to be obtained in units of pictures, and the image feature value is based on a picture motion evaluation value obtained by adding the absolute values of prediction error values of all the macroblocks included in the P picture or the B picture; and
    a coding circuit configured to code said input image and output a coded stream,
    wherein said coding circuit includes a filter part configured to perform a deblocking filtering process on an image generated in a coding process on the basis of said filter strength, and
    a process of calculating said filter strength performed by said strength evaluation circuit and said coding process performed by said coding circuit are performed concurrently in units of pictures.

2. The image processing apparatus according to claim 1, wherein
    said filter part includes a filter strength correction part configured to correct said filter strength to be applied to a current picture by using an arithmetic expression with said filter strength calculated for said current picture and said filter strength calculated for a past picture used as an input parameter.

3. The image processing apparatus according to claim 1, wherein
    the strength evaluation circuit obtains one picture-worth of the image feature values in a picture to be processed,
    the filter part of the coding circuit determines, based on a result obtained by the strength evaluation circuit, whether or not the deblocking filtering process is performed on the picture to be processed, and
    when the filter part of the coding circuit determines to perform the deblocking filtering process, the filter part of the coding circuit performs the deblocking filtering process on the picture to be processed with a filter strength that the strength evaluation circuit calculates based on the image feature values in the picture to be processed.

4. The image processing apparatus according to claim 1, wherein
    the strength evaluation circuit calculates the filter strength for an N+1th picture from the image feature value for the N+1th picture during a first period, which is a period in which the coding circuit codes an Nth picture, N being a natural number.

5. An image conversion apparatus, comprising:
    a decoding circuit configured to decode an inputted first coded stream and output a decoded image;
    a strength evaluation circuit configured to:
        (1) calculate a filter strength from an image feature value of said decoded image when a picture type of the decoded image is I picture, wherein the image feature value is to be obtained in units of pictures, and the image feature value is based on a picture activity value obtained by adding the absolute values of the activity values of all the macroblocks included in the I picture, and
        (2) calculate a filter strength from the image feature value of the decoded image when the picture type of the input image is P picture or B picture, wherein the image feature value is to be obtained in units of pictures, and the image feature value is based on a picture motion evaluation value obtained by adding the absolute values of prediction error values of all the macroblocks included in the P picture or the B picture; and
    a coding circuit configured to code said decoded image and output a second coded stream,
    wherein said coding circuit includes a filter part configured to perform a deblocking filtering process on an image generated in a coding process on the basis of said filter strength, and
    a process of calculating said filter strength performed by said strength evaluation circuit and said coding process performed by said coding circuit are performed concurrently in units of pictures.

6. The image conversion apparatus according to claim 5, wherein said filter part includes a filter strength correction part configured to correct said filter strength to be applied to a current picture by using an arithmetic expression with said filter strength calculated for said current picture and said filter strength calculated for a past picture used as an input parameter.

7. The image conversion apparatus according to claim 5, wherein
    the strength evaluation circuit obtains one picture-worth of the image feature values in a picture to be processed,
    the filter part of the coding circuit determines, based on a result obtained by the strength evaluation circuit, whether or not the deblocking filtering process is performed on the picture to be processed, and
    when the filter part of the coding circuit determines to perform the deblocking filtering process, the filter part of the coding circuit performs the deblocking filtering process on the picture to be processed with a filter strength that the strength evaluation circuit calculates based on the image feature values in the picture to be processed.

8. The image conversion apparatus according to claim 5, wherein
    the decoding circuit decodes the inputted first coded stream for an N+1th picture and outputs the decoded image for the N+1th picture during a first period, which is a period in which the coding circuit codes an Nth picture, N being a natural number, and
    the strength evaluation circuit calculates the filter strength for the N+1th picture from the image feature value for the N+1th picture during the first period.

* * * * *